US008587684B2

(12) United States Patent
Tamaru et al.

(10) Patent No.: US 8,587,684 B2
(45) Date of Patent: Nov. 19, 2013

(54) IMAGING APPARATUS, IMAGE PROCESSING METHOD, AND IMAGE PROCESSING PROGRAM

(75) Inventors: Masaya Tamaru, Miyagi (JP); Makoto Oishi, Miyagi (JP); Koichi Tanaka, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 360 days.

(21) Appl. No.: 12/687,709

(22) Filed: Jan. 14, 2010

(65) Prior Publication Data

US 2010/0177208 A1    Jul. 15, 2010

(30) Foreign Application Priority Data

Jan. 15, 2009    (JP) .................................. 2009-006404

(51) Int. Cl.
  *H04N 5/225*    (2006.01)
  *H04N 5/228*    (2006.01)
(52) U.S. Cl.
  USPC ........ 348/222.1; 348/169; 348/170; 348/171; 348/172
(58) Field of Classification Search
  USPC ........... 348/154–155, 169–172, 218.1, 222.1, 348/239, 207.99
  See application file for complete search history.

(56) References Cited

U.S. PATENT DOCUMENTS

| 5,949,481 | A | 9/1999 | Sekine et al. |
| 7,999,849 | B2 * | 8/2011 | Neff et al. ...................... 348/155 |
| 8,031,226 | B2 * | 10/2011 | Takemoto et al. ............ 348/169 |
| 2005/0232514 | A1 * | 10/2005 | Chen ............................ 382/298 |
| 2006/0007327 | A1 | 1/2006 | Nakamura et al. |
| 2006/0062433 | A1 | 3/2006 | Ikeda |
| 2007/0120997 | A1 * | 5/2007 | Sasaki et al. ................... 348/362 |
| 2008/0100709 | A1 * | 5/2008 | Furukawa ...................... 348/169 |
| 2009/0135257 | A1 * | 5/2009 | Takagi et al. .............. 348/207.2 |
| 2009/0135270 | A1 * | 5/2009 | Makino et al. ............. 348/222.1 |

FOREIGN PATENT DOCUMENTS

| EP | 2 081 150 A1 | 7/2009 |
| JP | 2-116810 A | 5/1990 |
| JP | 2006-025312 A | 1/2006 |
| JP | 2006-086933 A | 3/2006 |
| JP | 2007-74031 | 3/2007 |
| JP | 2007-74031 A | 3/2007 |

(Continued)

OTHER PUBLICATIONS

Notification of Grounds For Rejection dated Oct. 23, 2012 with English translation.

(Continued)

*Primary Examiner* — Timothy J Henn
*Assistant Examiner* — Pritham Prabhakher
(74) *Attorney, Agent, or Firm* — McGinn IP Law Group, PLLC

(57) ABSTRACT

An imaging apparatus is equipped with: imaging means, for obtaining images of a subject; imaging control means, for controlling the imaging means to sequentially obtain a plurality of images; reference image selecting means, for selecting a single reference image from among the plurality of images; moving object region specifying means, for specifying moving object regions within corresponding images, which are the plurality of images other than the selected reference image; positioning means, for positioning the plurality of corresponding images with respect to the reference image in the case that the plurality of images have been imaged by flow shooting, the positioning being performed such that the amount of positioning is greater at the specified moving object regions than at non moving object regions; and combining means, for combining the plurality of corresponding images, which have been positioned by the positioning means, with the reference image.

13 Claims, 8 Drawing Sheets

(56) References Cited

FOREIGN PATENT DOCUMENTS

WO   WO 2009/091259 A1   7/2009

OTHER PUBLICATIONS

European Office Action dated Oct. 13, 2011.
Van Eekeren, A. et al. "Super-Resolution on Moving Objects and Background," IEEE International Conference on Image Processing, Oct. 11, 2006, pp. 2709-2712.
European Search Report dated Aug. 13, 2010.
Van Eekeren, A. et al. "Super-Resolution on Moving Objects and Background." IEEE International Conference on Image Processing, Oct. 11, 2006, pp. 2709-2712.
Japanese Office Action dated Jun. 5, 2012 with a partial English translation thereof.
Chinese Office Action dated Jun. 5, 2013 with an English translation thereof.

* cited by examiner

FIG.10A
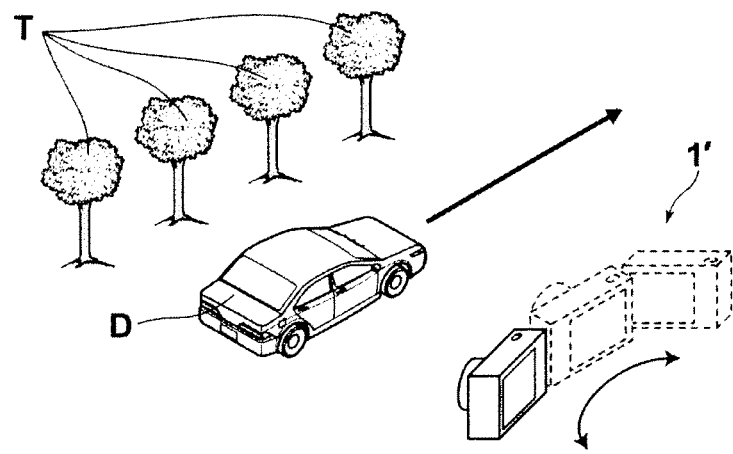
FIG.10B
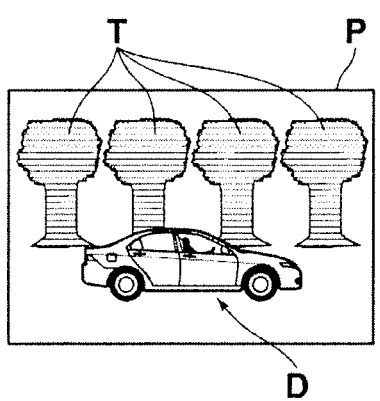
SUCCESSFULLY OBTAINED
FLOW SHOT IMAGE
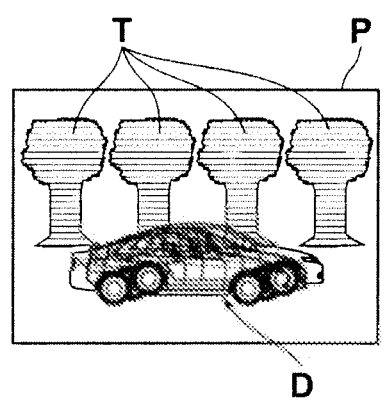
UNSUCCESSFULLY OBTAINED
FLOW SHOT IMAGE

FLOW SHOT IMAGE
(MOVING OBJECT PICTURED STILL WITH DISCONTINUOUS BACKGROUND)

DISCONTINUITIES GENERATED DUE TO POSITIONING

IMAGING APPARATUS, IMAGE PROCESSING METHOD, AND IMAGE PROCESSING PROGRAM

BACKGROUND OF THE INVENTION

1. Field of the Invention

The present invention is related to an imaging apparatus, such as a digital still camera. The present invention is particularly related to an imaging apparatus having a flow shooting function, an image processing method for processing flow shot images, and an image processing program for processing flow shot images.

2. Description of the Related Art

A photography technique called flow shooting is conventionally known. In this technique, photography is performed while panning a camera 1' to track the movement of a moving object D, such as the car illustrated in FIG. 10A. Thereby, an image P that gives an impression of speed, in which the moving object D (the car) appears to be still while the background T (trees) appears to flow corresponding to the amount of movement of the camera 1' during exposure, is obtained as illustrated toward the left side of FIG. 10B. However, panning the camera 1' to track the movement of the moving body D is a difficult photography technique, and many failures occur. In the case of failure, an image P, in which the background T appears to flow but the moving object D is blurred, is obtained as illustrated toward the right side of FIG. 10B.

U.S. Patent Application Publication No. 20060007327 discloses a technique that facilitates flow shooting. In this technique, continuous photography is performed while panning a camera 1', to obtain a plurality of frame images P1 through P4, as illustrated in FIG. 11A. A reference frame image (frame image P2, for example) is selected from among the plurality of obtained frame images P1 through P4. Positioning processes are administered on the frame images P1, P3, and P4 such that the positions of moving objects D1, D3, and D4 therein match the position of a moving object D2 within the reference frame image P2. Thereafter, the plurality of frame images P1 through P4 are combined, to obtain an image C, in which the moving object D is pictured as a stationary object, even if the movement of the moving object D and the movement of the camera 1' are slightly shifted.

In the technique disclosed in U.S. Patent Application Publication No. 20060007327, the moving object D is pictured as a stationary object in the ultimately obtained image C. However, in the case that a background T is arrayed from the left side to the right side (the horizontal direction) within images P as in FIG. 11A, and the moving object D moves from the background toward the foreground of the images P of FIG. 11A, that is, in a direction toward the camera 1', the positioning will result in blurring in the background to foreground direction of the frame images P1 through P4, as illustrated in FIG. 11B. There are cases in which this blurring will result in the flow of the background T becoming discontinuous, as illustrated in FIG. 11A. This discontinuity is due to the panning direction of the camera 1' and the movement direction of the moving object D not being completely matched. In the case that the background T is discontinuous, the image C appears to flow unnaturally, and the impression of speed may be lost.

In view of this problem, a technique for obtaining the effects of flow shooting has been proposed in Japanese Unexamined Patent Publication No. 2007-074031. In this technique, each of a plurality of frame images P1 through P4 is divided into a moving object D portion and a background T portion. Then, only the moving object portions D are positioned among the plurality of frame images P1 through P4 and combined. A brush process is administered on the background T portions, according to the direction and amount of a difference vector between the movement vector of the moving object D and the movement vector of the background T, to generate an interpolative image. Thereafter, the interpolative image and the combined moving object portion D are combined.

However, there is a possibility that the required processing time and memory capacity will increase, in order to generate the interpolative image in the technique proposed in Japanese Unexamined Patent Publication No. 2007-074031.

SUMMARY OF THE INVENTION

The present invention has been developed in view of the foregoing circumstances. It is an object of the present invention to provide an imaging apparatus, an image processing method, and an image processing program that enables effective obtainment of flow shot images without increasing processing time or required memory capacity.

An imaging apparatus of the present invention is characterized by comprising:

imaging means, for obtaining images by imaging a subject;

imaging control means, for controlling the imaging means to sequentially obtain a plurality of images;

reference image selecting means, for selecting a single reference image from among the plurality of images;

moving object region specifying means, for specifying moving object regions within corresponding images, which are the plurality of images other than the reference image selected by the reference image selecting means;

positioning means, for positioning the plurality of corresponding images with respect to the reference image in the case that the plurality of images have been imaged by flow shooting, the positioning being performed such that the amount of positioning is greater at the moving object regions specified by the moving object region specifying means than at non moving object regions; and combining means, for combining the plurality of corresponding images, which have been positioned by the positioning means, with the reference image.

In the present specification, the expression "amount of positioning" assumes a value of 100(%) when positioning is performed such that a predetermined region within the reference image and predetermined regions within the corresponding images are substantially matched. Conversely, the expression "amount of positioning" assumes a value of 0(%) when positioning is performed without moving the predetermined regions within the corresponding images to match the predetermined region within the reference image. Note that a percentage corresponding to an amount of shifting becomes the "amount of positioning" when a predetermined region within a corresponding images is shifted to match the predetermined region within the reference image.

In the present specification, the expression "moving object region" refers to a region in which a subject which is moving with respect to an imaging element is pictured, from among regions of images imaged by the imaging element. Note that the moving object region may be a region that includes only the moving object, or may be a region of a predetermined size that surrounds the moving object. In addition, the expression "non moving object regions" refers to the imaged regions within the images other than the moving object regions.

In addition, the expression "to sequentially obtain a plurality of images" refers to obtaining images that would normally be obtained with a single exposure operation by performing a plurality of exposure operations.

The imaging apparatus of the present invention may adopt a configuration, wherein the moving object regions are predetermined regions within the images.

It is preferable for the imaging apparatus of the present invention to further comprise:

feature point detecting means, for detecting feature points within the reference image; and corresponding point detecting means, for detecting corresponding points within the corresponding images that correspond to the feature points detected by the feature point detecting means. In this case, the moving object region specifying means specifies the moving object regions, based on the feature points detected by the feature point detecting means and the corresponding points detected by the corresponding point detecting means.

The imaging apparatus of the present invention may adopt a configuration, wherein the amount of positioning performed by the positioning means with respect to the regions of the images other than the moving object regions is 0.

An image processing method of the present invention is characterized by comprising the steps of:

obtaining a plurality of images by flow shooting;

selecting a reference image from among the plurality of obtained images;

specifying moving object regions within corresponding images, which are the plurality of images other than the selected reference image;

positioning the plurality of corresponding images with respect to the reference image, the positioning being performed such that the amount of positioning is greater at the specified moving object regions than at non moving object regions; and combining the plurality of corresponding images, which have been positioned by the positioning means, with the reference image.

It is preferable for the image processing method of the present invention to further comprise the steps of:

detecting feature points within the reference image; and detecting corresponding points within the corresponding images that correspond to the feature points detected by the feature point detecting means. In this case, the moving object regions are specified, based on the detected feature points and the detected corresponding points.

The image processing method of the present invention may be executed in a manner such that the positioning is performed with an amount of positioning of 0 with respect to the regions of the images other than the moving object regions.

An image processing program of the present invention is characterized by causing a computer to execute the procedures of:

obtaining a plurality of images by flow shooting;

selecting a reference image from among the plurality of obtained images;

specifying moving object regions within corresponding images, which are the plurality of images other than the selected reference image;

positioning the plurality of corresponding images with respect to the reference image, the positioning being performed such that the amount of positioning is greater at the specified moving object regions than at non moving object regions; and combining the plurality of corresponding images, which have been positioned by the positioning means, with the reference image.

It is preferable for the image processing program of the present invention to further cause a computer to execute the procedures of:

detecting feature points within the reference image; and detecting corresponding points within the corresponding images that correspond to the feature points detected by the feature point detecting means. In this case, the moving object regions are specified, based on the detected feature points and the detected corresponding points.

The image processing program of the present invention may cause a computer to execute the procedures in a manner such that the positioning is performed with an amount of positioning of 0 with respect to the regions of the images other than the moving object regions.

Note that the programs of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

In the imaging apparatus, the image processing method, and the image processing program of the present invention, a plurality of images imaged by flow shooting are obtained. Then, a reference image is selected from among the obtained plurality of images. Thereafter, moving object regions are specified within corresponding images, which are the plurality of images other than the reference image. Next, the plurality of corresponding images are positioned with respect to the reference image such that the amount of positioning is greater at the moving object regions than at non moving object regions. Finally, the plurality of corresponding images, which have been positioned, are combined with the reference image. The moving object region and the regions other than the moving object region are separated and positioned. Therefore, it is not necessary to generate interpolative images, and processing time for generating the interpolative images and memory for storing the interpolative images are obviated. Accordingly, effective flow shot images can be obtained without increasing processing time or required memory capacity.

BRIEF DESCRIPTION OF THE DRAWINGS

FIG. 10A is a diagram for explaining flow shooting.

FIG. 10B is a collection of diagrams that illustrate a successfully imaged flow shot image and an unsuccessfully image flow shot image.

DESCRIPTION OF THE PREFERRED EMBODIMENTS

Figure 1:
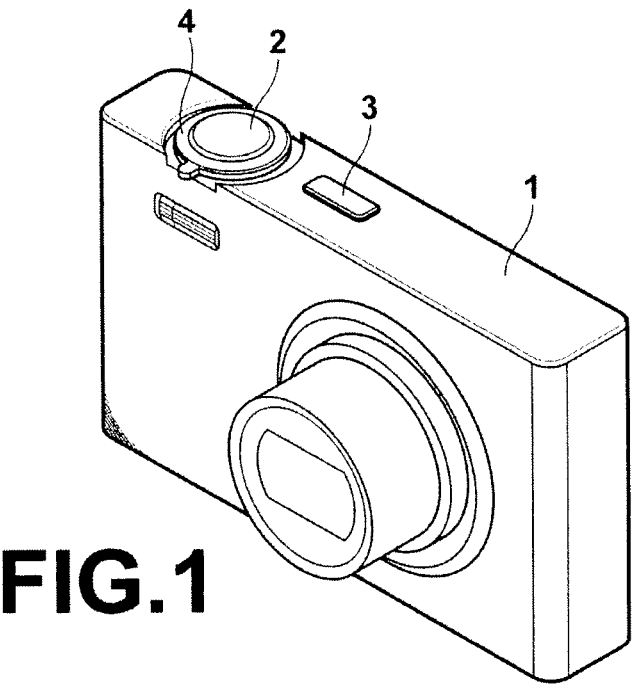
FIG. 1 is a perspective front view that illustrates the outward appearance of a digital camera to which the imaging apparatus according to an embodiment of the present invention is applied.
Figure 2:
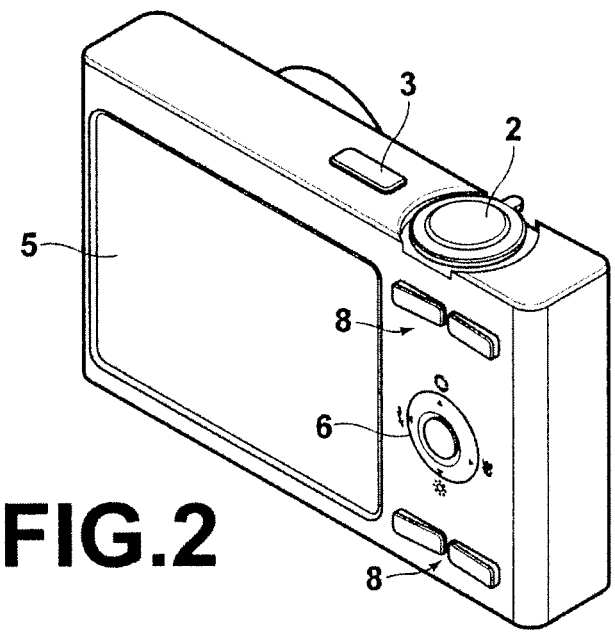
FIG. 2 is a perspective rear view that illustrates the outward appearance of the digital camera to which the imaging apparatus according to the embodiment of the present invention is applied.

Hereinafter, embodiments of the present invention will be described with reference to the attached drawings. FIG. 1 and FIG. 2 are perspective views that illustrate the outward appearance of a digital camera 1, to which an imaging apparatus according to an embodiment of the present invention is applied. As illustrated in FIG. 1 and FIG. 2, a shutter release button 2, a power button 3, and a zoom lever 4 are provided at the upper portion of the digital camera 1.

The shutter release button 2 is of a structure that can command two types of operations by being depressed in two steps. For example, during a photography operation that utilizes an AE (Automatic Exposure) function and an AF (Automatic Focus) function, the digital camera 1 sets an optimal exposure and an optimal focal point when the shutter release button 3 is depressed lightly (also referred as "half depression"). If the shutter release button 3 is depressed strongly (also referred to as "full depression") in this state, the digital camera 1 initiates exposure with the set conditions, then records image data obtained by the exposure corresponding to a single frame into a recording medium 34.

A monitor 5 such as an LCD, a mode dial 6 which is utilized to set photography modes and the like, and various operating buttons 8 are provided on the rear surface of the digital camera. Note that in the present embodiment, photography modes, in which photography is performed, and a playback mode, in which images recorded in the recording medium 34 are reproduced by the monitor 5, are settable as operating modes. In addition, a normal photography mode, in which normal photography is performed, and a flow shooting mode, in which photography is performed by flow shooting, are settable as the photography modes.

Figure 3:
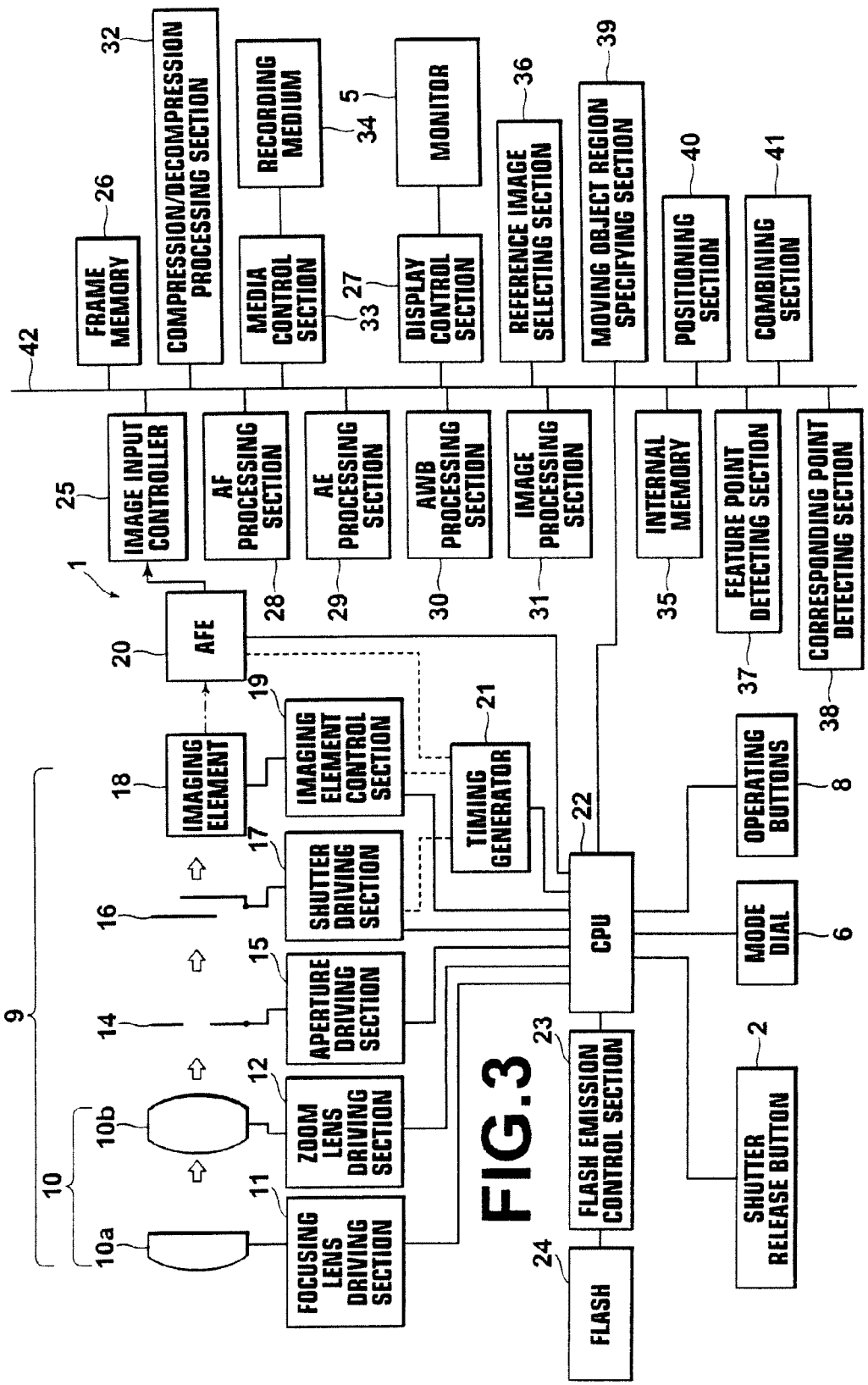
FIG. 3 is a schematic block diagram that illustrates the inner structure of the digital camera to which the imaging apparatus according to the embodiment of the present invention is applied.

Next, the inner structure of the digital camera 1 will be described. FIG. 3 is a schematic block diagram that illustrates the inner structure of the digital camera 1, to which the imaging apparatus according to the embodiment of the present invention is applied. As illustrated in FIG. 3, the digital camera 1, to which the imaging apparatus according to the embodiment is applied, is equipped with an imaging system (imaging means).

The imaging system (imaging means) 9 is equipped with imaging lenses 10, constituted by a focusing lens 10a for focusing onto subjects and a zoom lens 10b for realizing a zoom function. The focusing lens 10a and the zoom lens 10b are driven by a focus lens driving section 11 and a zoom lens driving section 12, which are respectively constituted by a motor and a motor driver, so as to be movable in the direction of the optical axes thereof. The focusing lens driving section 11 drives the focusing lens 10a based on commands output from an AF processing section 28 to be described later. The zoom lens driving section 12 controls the driving of the zoom lens 10b based on commands output from a CPU 22 corresponding to the operation of the zoom lever 4.

An aperture 14 is constituted by a plurality of aperture blades. An aperture driving section 15 is realized by a miniature motor, such as a stepping motor. The aperture driving section 15 adjusts the positions of the aperture blades according to aperture value data output from an AE processing section 29 such that the aperture size becomes a size suited for the purpose of photography.

A shutter 16 is a mechanical shutter, and is driven by a shutter driving section 17. The shutter driving section 17 controls the opening and closing of the shutter 16 according to a signal which is generated when the shutter release button 2 is depressed, and also according to shutter speed data output from the AE processing section 29.

An imaging element 18 is provided behind the shutter 16. In the present embodiment, an imaging element 18 of the CMOS type is employed. The imaging element 18 has a photoelectric converting surface, in which a plurality of light receiving elements are arranged two dimensionally. Light which has passed through an optical system including the imaging lenses 10 is focused onto the photoelectric converting surface, and photoelectrically converted. A microlens array for focusing light onto each pixel, and a color filter array, in which R, G, and B filters are arranged in a regular manner, are provided in front of the photoelectric converting surface. The imaging element 18 outputs electric charges which are accumulated for each pixel as analog image signals pixel by pixel, synchronized with readout signals supplied by an imaging element control section 19. Note that the amount of time between initiation of accumulation of electric charges until readout of the electric charges for each pixel, that is, the shutter speed of an electronic shutter, is determined by an electronic shutter driving signal provided by the imaging element control section 19. The exposure time is set by the AE processing section 29, to be described later. In addition, the gain of the imaging element 18 is set by the imaging element control section 19 such that analog image signals of a predetermined size can be obtained.

The analog image signals which are read out from the imaging element 18 are input into an AFE 20 (Analog Front End). The AFE 20 is constituted by: a correlated double sampling (CDS) circuit for removing noise from the analog image signals; an automatic gain controller (AGC) for adjusting the gain for the analog image signals; and an A/D converter (ADC) for converting the analog image signals to digital image data. The digital image data that the analog signals are converted into are RAW data having RGB density values for each pixel.

A timing generator 21 generates timing signals (synchronization signals). The timing signals are input to the shutter driving section 17, the imaging element control section 19, and the AFE 20, to synchronize the operation of the shutter release button 2, the opening and closing of the shutter 16, readout of charges from each line or each pixel of the imaging element 18, and the processing by the AFE 20.

The CPU 22 (imaging control means) controls each component of the digital camera 1, according to signals from the shutter release button 2, the operating buttons 8, and each of the processing section, such as the AE processing section 29. Note that in the present embodiment, in the case that the normal photography mode is set as the photography mode, the CPU 22 causes the imaging system 9 to perform an imaging operation that reads out electric charges obtained by the imaging element 18 in a single exposure operation corresponding to a single full depression of the shutter release button 2. On the other hand, in the case that the flow shooting mode is set as the photography mode, the CPU 22 causes readout of electric charges to be performed a plurality of times during an exposure period instead of a single readout operation, to perform so called continuous imaging, and obtains a plurality of image corresponding to the electric charges which are read out during each readout operation. Note that the plurality of images are combined as will be described later, to generate a combined image. Note also that in the flow shooting mode, the AE processing section 29 sets an interval (designated as T) between exposure times, that is, between electrical charge readout operations, and a number n of readout operations, based on a shutter speed, that is, an exposure time (designated as T0) which is set based on a preliminary image.

During photography in the normal photography mode, the shutter 16 is opened according to a shutter speed set by the AE processing section 29, the imaging element 18 is exposed for an exposure time T0 corresponding to the shutter speed, and a single electric charge readout operation is performed. On the other hand, during photography in the flow shooting mode, the shutter 16 is maintained in the open state from depression of the shutter release button 2 until a set number n of electric charge readout operations are completed. During this time, continuous imaging, in which electric charges are repeatedly readout form the imaging element at intervals of a set exposure time T, is performed to obtain a plurality of images.

For example, in the case that the exposure time T0 is ¼ second in the case that divided photography operations are not to be performed (during normal photography) and the exposure time T1 in the case that divided photography operations are to be performed (during flow shooting), four exposure operations are performed at exposure times T1 of ¹⁄₁₆ second in the flow shooting mode, to obtain four frame images.

Note that in the flow shooting mode, a plurality of frame images which are continuously imaged while the position of the digital camera remains constant, as illustrated in FIG. 10A, and a user moves the angle that the camera faces to match the movement of a moving object D (the car), that is, pans the camera, are obtained.

The digital camera 1 is also equipped with a flash 24, for emitting light when necessary during photography. The light emission of the flash 24 is controlled by a flash emission control section 23.

In addition, the digital camera 1 is equipped with an image input controller 25, for transferring the image data output from the AFE 20 to other processing sections via a data bus 42, and a frame memory 26, for temporarily storing the image data which is transferred from the image input controller 25.

The frame memory 26 is a memory used as workspace for various types of digital image processes (signal processing) on the image data, which will be described later, and is constituted by an SDRAM (Synchronous Dynamic Random Access Memory) that carries out data transfer in synchronization with a bus clock signal of a predetermined period, for example.

A display control section 27 functions to display the image data stored in the frame memory 26 as a through the lens image on the monitor 5, and to display image data stored in the recording medium 34 in the playback mode. Note that the through the lens image is continuously obtained by the imaging system 9 at predetermined intervals synchronized with the synchronization signals generated by the timing generator 21 when a photography mode is selected.

The AF processing section 28 and the AE processing section 29 determine photography conditions based on a preliminary image. The preliminary image is obtained by the imaging element 18 when the CPU 22 detects a half depression signal generated by the shutter release button 2 being depressed halfway, and is an image which is stored in the frame memory 26.

The AF processing section 28 detects a focusing position of the focusing lens 10a based on the preliminary image. The TTL method, in which a characteristic that the contrast value of images increases in a focused state is utilized, may be applied to detect the focusing position, for example.

The AE processing section 29 measures the luminance of subjects based on the preliminary image, and determines exposure conditions such as an aperture value, a shutter speed and the like, based on the luminance (AE processing). Specifically, the AE processing section 29 divides the preliminary image into 64 light measuring regions in an 8×8 formation, then sets the shutter speed and the aperture value based on the luminance of each region and a program chart which is stored in an internal memory 35 to be described later.

An AWB processing section 30 automatically adjusts the white balance during photography (AWB processing).

An image processing section 31 administers image quality enhancement processes such as gradation correction, sharpness correction, and color correction on image data of a final image. The image processing section 31 also administers YC processes to convert the RAW data into YC data comprising Y data as a luminance signal, Cb data as a blue color difference signal, and Cr data as a red color difference signal. The final image is an image based on the image data stored in the frame memory 26 via the AFE 20 and the image input controller 25 after input of the analog image data from the imaging element 18.

A compression/decompression section 32 carries out compression processes to a format such as JPEG on the image data, which has been subjected to the image enhancement processes and the like by the image processing section 31, and generates an image file. Accompanying information, such as the date and time of photography, is added z as tags to the image file, based on the Exif format.

A media control section 33 accesses and carries out image-file reading and writing from and to the recording medium 34, which is removably loaded into a media slot (not shown).

The recording medium 34 is a recording medium which is capable of storing various types of data, and is constituted by a magnetic recording medium, an optical recording medium, a semiconductor memory, or the like.

The internal memory 35 has stored therein various constants which are set in the digital camera 1, look up tables, programs to be executed by the CPU 22, and the like.

A reference image selecting section 36 (reference image selecting means) selects a single reference image from among the plurality of frame images which are sequentially obtained by the imaging system 9 in the flow shooting mode.

A feature point detecting section 37 (feature point detecting means) detects a plurality of feature points from within the reference image which is selected by the reference image selecting section 36. The feature points are points that exhibit characteristics as the corners of the subject, image patterns, or the like, and are extracted based on gradient data of pixel signals and the like. The feature points may be detected by utilizing the Moravec method, the Harris method, the Shi-Tomai method or the like. In the present invention, the method for detecting the feature points is not particularly limited, as long as the feature points can be extracted.

A corresponding point detecting section 38 (corresponding point detecting means) detects corresponding points within a plurality of corresponding images, which are the plurality of images other than the reference image selected by the reference image selecting section 36, by tracking where the feature points extracted by the feature point detecting section 37 have moved to therein. The corresponding points are points having characteristics that match those of the feature points. The KLT Tracker method, the block matching method, or the like may be utilized to detect the corresponding points. In the present invention, the detecting method for detecting the corresponding points is not particularly limited.

A moving object region specifying section 39 (moving object region specifying means) specifies a moving object region within each of the plurality of corresponding images, which are the plurality of images other than the reference image selected by the reference image selecting section 36. Note that the method for specifying the moving object region will be described in detail later.

A positioning section 40 (positioning means) positions each the plurality of corresponding images with respect to the reference image in the case that the plurality of images are obtained by flow shooting. The characteristic feature of the present invention is that the positioning is performed such that the amount of positioning is greater at the moving object regions specified by the moving object region specifying section 39 than at nonmoving object regions. Note that the method by which positioning is performed will be described in detail later.

A combining section 41 (combining means) combines the plurality of corresponding images, which have been positioned by the positioning section 40, with the reference image, to generate a combined image. Note that the plurality of images may be performed by adding the pixel values of corresponding pixels among the plurality of images, or by calculating the average values of pixel values of corresponding pixels among the plurality of images. The method by which the images are combined will be described in detail later.

The data bus 42 is connected to each of the processing sections, the frame memory 26, the CPU 22, and the like, and functions to transfer image data and various commands. The digital camera 1 is configured as described above.

Figure 4:
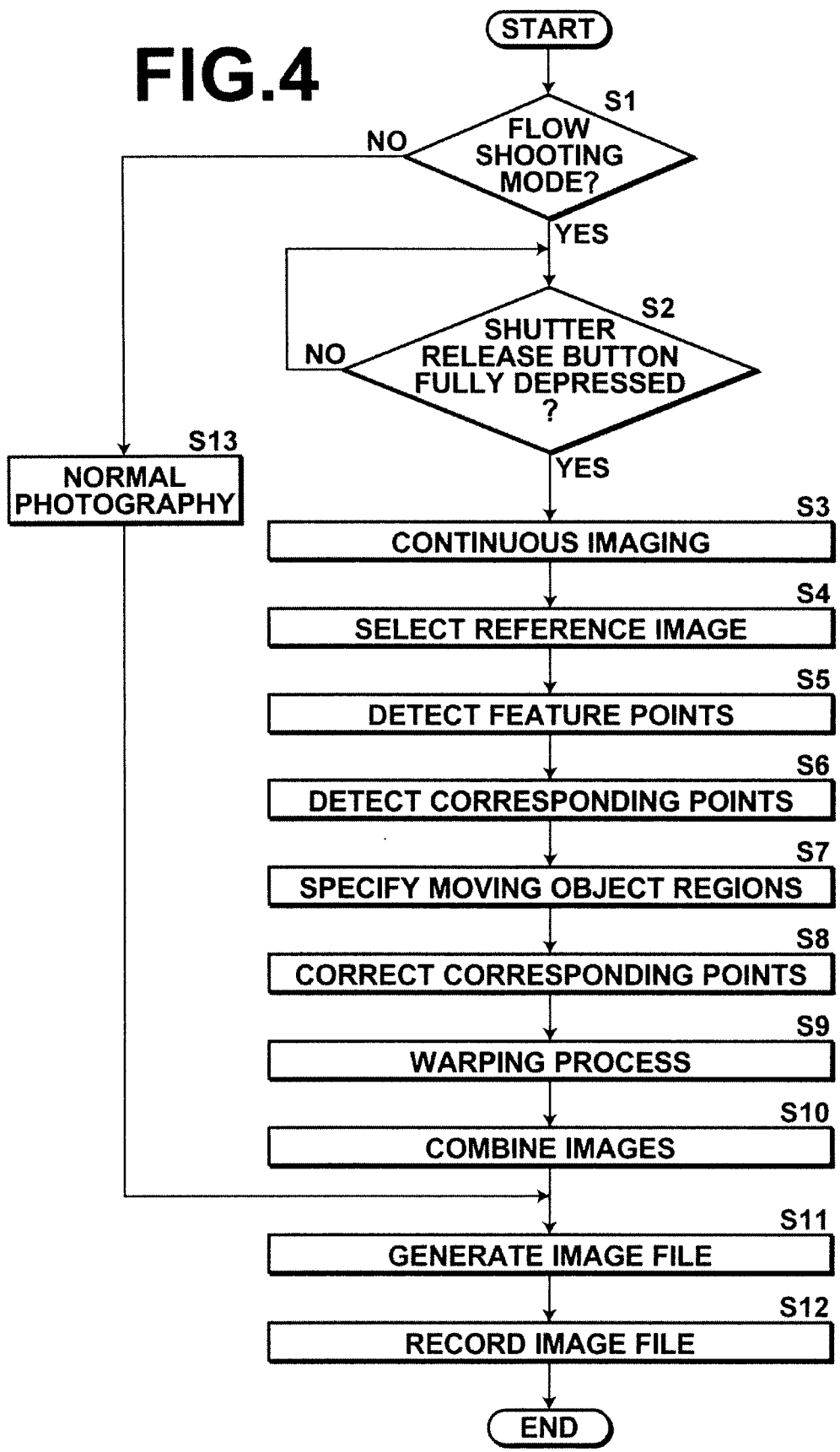
FIG. 4 is a flow chart that illustrates the steps of an imaging process performed by the digital camera of FIG. 3.
Figure 5:
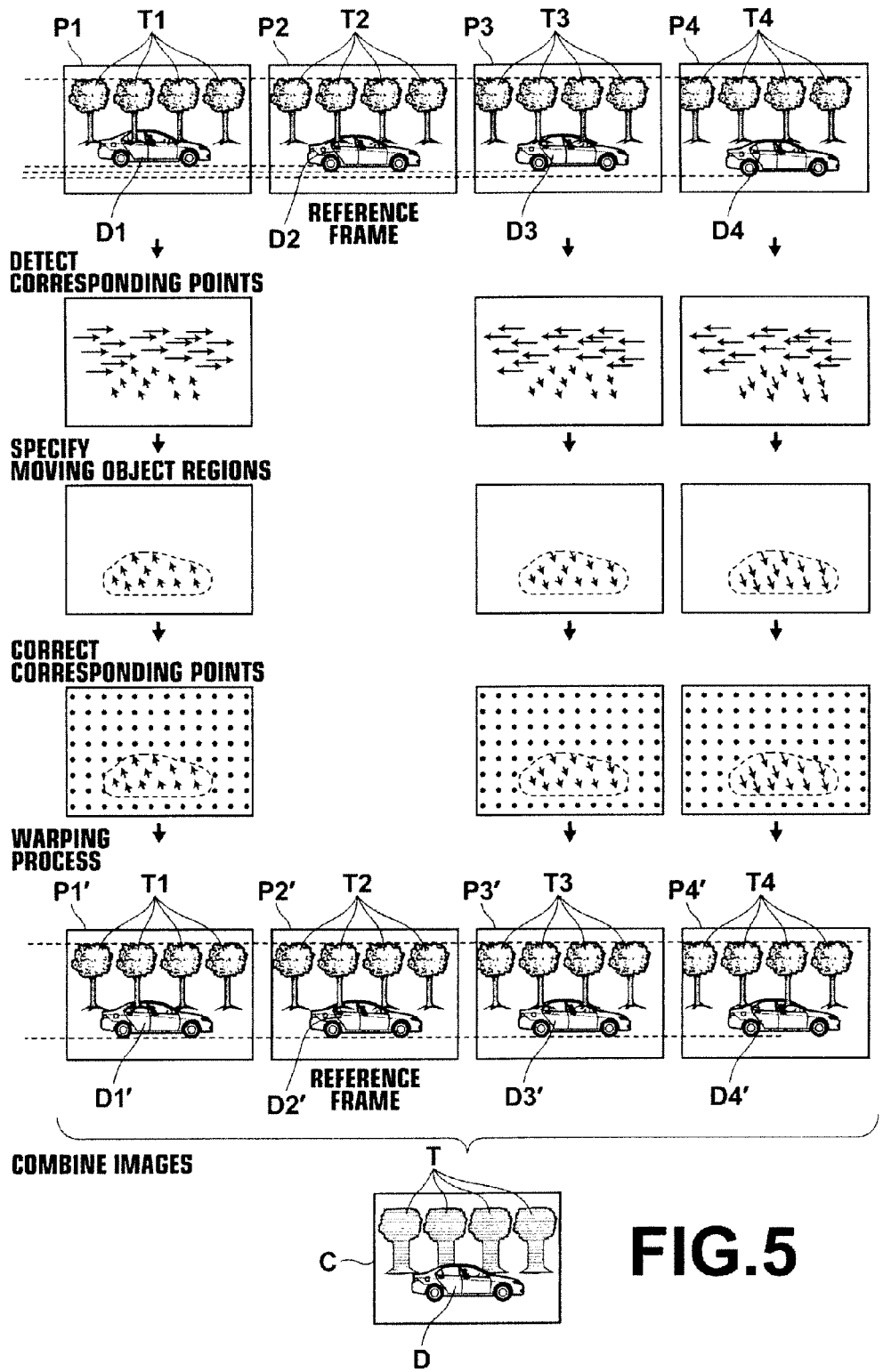
FIG. 5 is a collection of diagrams that illustrate the concept of the imaging process of FIG. 4.
Figure 6:
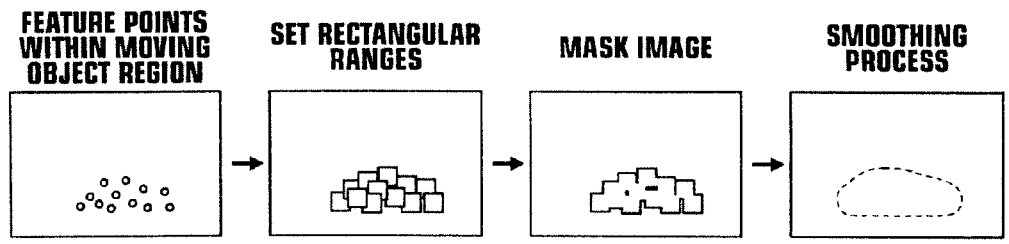
FIG. 6 is a collection of diagrams for explaining the method by which a moving object region is specified.
Figure 7:
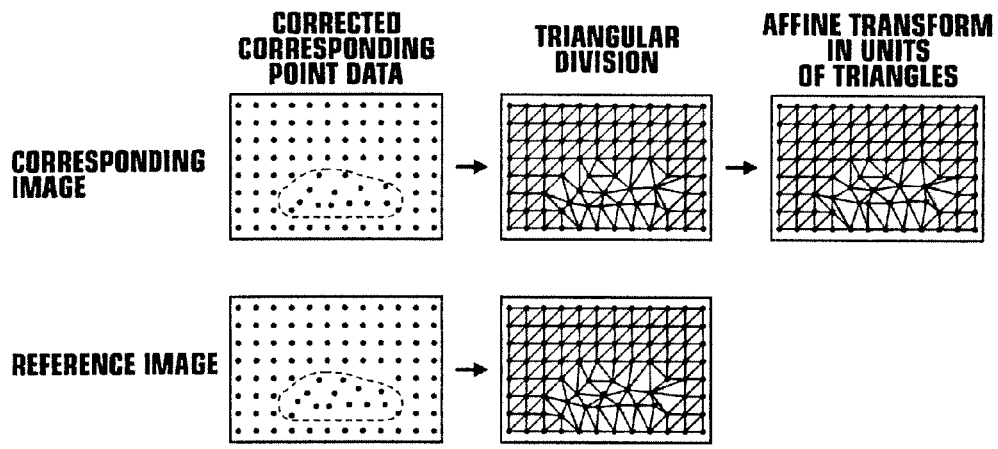
FIG. 7 is a collection of diagrams for explaining a warping process.
Figure 8:
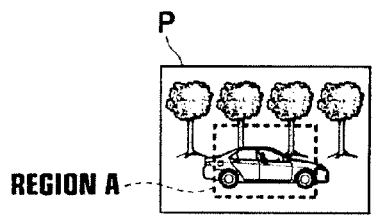
FIG. 8 is a diagram that illustrates an example of a predetermined region.

Next, the operation of the digital camera 1 of the present invention will be described. FIG. 4 is a flow chart that illustrates the steps of an imaging process performed by the digital camera 1. FIG. 5 is a collection of diagrams that illustrate the concept of the imaging process of FIG. 4. FIG. 6 is a collection of diagrams for explaining the method by which a moving object region is specified. FIG. 7 is a collection of diagrams for explaining a warping process. FIG. 8 is a diagram that illustrates an example of a predetermined region.

With reference to the flow chart of FIG. 4, in the digital camera 1 having the configuration described above, first, the CPU 22 judges whether the photography mode is set to the flow shooting mode (step S1). In the case that the flow shooting mode is set (step S1: YES), the CPU 22 judges whether the shutter release button 2 is fully depressed (step S2). In the case that the shutter release button 2 is not fully depressed (step S2: NO), the process of step S2 is repeated.

On the other hand, in the case that the shutter release button 2 is fully depressed (step S2: YES), the CPU 22 causes the imaging system 9 to sequentially obtain a plurality of frame images, that is the CPU 22 causes the imaging system 9 to perform continuous imaging (step S3).

Flow shooting is performed by a user panning the digital camera 1 in the horizontal direction so as to track the movement of a car D, which is a moving object. Therefore, the plurality of frame images obtained by the continuous imaging are obtained while the digital camera 1 is being panned in the horizontal direction (refer to FIG. 10A).

For example, as illustrated in FIG. 5, if the entire exposure time is ¼ second and four frame images P1 through P4 are photographed at exposure times of ¹⁄₁₆ second, trees T1 through T4 in the background, which are not moving objects, move in the horizontal direction due to the user panning the digital camera 1 in the horizontal direction. On the other hand, the cars D1 through D4 approaches the digital camera 1 in small increments, and therefore, the positional relationships among the background trees T1 through T4 and the cars D1 through D4 in the depth direction of the images become shifted.

In addition, because the exposure times of each of the frame images P1 through P4 are ¹⁄₁₆ second, blur in the horizontal direction is generated corresponding to the exposure times in the background trees T1 through T4. On the other hand, blur in the horizontal direction is small in the cars D1 through D4, due to the digital camera 1 being panned.

After the digital camera 1 obtains the plurality of frame images P1 through P4 by continuous imaging (step S3), the reference image selecting section 36 selects a single reference frame image (hereinafter, referred to as "reference image") fm among the plurality of frame images P1 through P4 (step S4). In the present embodiment, the frame image P2 is selected as the reference image, as illustrated in FIG. 5. However, the method for selecting the reference image is not particularly limited and any one of the frame images may be selected as the reference image.

After the reference image P2 is selected (step S4), the feature point detecting section 37 detects feature points from within the selected reference image (step S5). Next, the corresponding point detecting section 38 detects corresponding points within the plurality of corresponding frame images (hereinafter, referred to as "corresponding images") P1, P3, and P4, that is, the plurality of frame images other than the reference image P2 (step S6).

The corresponding points are detected by tracking where the feature points of the reference image P2 have moved to within the corresponding images P1, P3, and P4, as illustrated in FIG. 5. The tracking results can be expressed as movement vectors, as illustrated in the second step from the top in FIG. 5. The beginning points of the movement vector arrows indicate the feature points, and the endpoints of the arrows indicate the corresponding points.

After the corresponding points are detected (step S6), the moving object region specifying section 39 specifies a moving object region (step S7). In the present embodiment, the moving object region is specified, by employing the detection results of the corresponding points. As described previously, in the case that flow shooting is administered, the digital camera 1 is panned by the user to track the car D, which is a moving object. Therefore, there is a high probability that regions having short movement vectors in the vicinity of the centers of the images are moving object regions. In addition, there is a high probability that regions having movement vectors which are long in the horizontal direction are non moving object regions. Accordingly, it may be judged that movement vectors having horizontal components which are less than or equal to a predetermined threshold value, for example, are feature points of moving object regions.

When the feature points of the moving object regions are specified, predetermined rectangular ranges in the peripheries of the feature points are set as the moving object regions to generate a mask image of the moving object region, as illustrated in FIG. 6. A smoothing process is administered in the spatial direction to smooth the boundary of the mask image, and the smoothed region is specified as the moving object region, as illustrated in the third step from the top of FIG. 5. Note that in the present embodiment, the specification of the moving object region is performed as described above with reference to FIG. 6. However, many methods for specifying moving object regions using corresponding point detection results have been proposed, and known methods other than that described above may be employed.

After the moving object regions are specified as described above (step S7), the positioning section 40 performs correction of the corresponding points (step S8). The correction of the corresponding points is performed such that the movement vectors within the specified moving object regions are maintained as they are, and movement vectors having zero movement components are set at predetermined lattice points for non moving object regions other than the moving object regions, as illustrated in the fourth step from the top of FIG. 5.

Note that if the gaps among the lattice points are set small, each of the triangles resulting from the triangular division illustrated in FIG. 7 become smaller. Therefore, triangles that straddle the boundary between the moving object regions and the non moving object regions can be made smaller, and distortions in the periphery of the moving object region due to warping can be reduced. However, in this case, the number of triangles to be processed increases, and a longer amount of processing time becomes necessary. Therefore, the spacing among the lattice points configured to be settable as appropriate by the user, taking the relationship between image quality and processing time into consideration.

Then, as illustrated in FIG. 7, the corrected corresponding point data, that is, the corrected movement vectors are designated to be the feature points at the endpoints of the movement vectors of the moving object region in the corresponding images P1, P3, and P4. With respect to the reference image P2, the beginning points of the movement vectors within the moving object region are designated as the feature points. Each of the frame images P1 through P4 are divided into triangular shapes having the feature points at the vertices thereof. At this time, the triangles are set such that corresponding feature points among each of the frame images P1 through P4 are positioned at the same vertices of the same triangles. Note that as known methods, such as the Delaunay triangular division method, may be employed to divide the images into triangles.

Next, the positioning section 40 performs a warping process, in which the images are deformed by administering affine transformation in units of the triangles (step S9). Warping is a process by which geometric conversion is performed on the corresponding images P1, P3, and P4 such that the coordinate values of the moving object regions therein match the coordinate values of the feature points within the moving object region of the reference image P2. The warping process can be performed by a process similar to the well known morphing process. The of fine transform in units of triangles is expressed by the following Formula (1).

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} s \\ t \end{pmatrix} \quad (1)$$

The coordinates of the three vertices of triangles $(x_i, y_i) = (x'_i, y'_i)$ (wherein $i = 1, 2, 3$) are substituted into Formula (I) above, and the 6 simultaneous equations are solved, to obtain the 6 parameters a, b, c, d, s, and t. The points within all of the triangles, that is, each pixel, undergoes affine transform based on the calculated parameters to deform the image, and the warping process is completed.

The moving object regions within the corresponding images P1, P3, and P4, which have undergone the warping process as described above, substantially match the moving object region in the reference image P2, while the non moving object regions are not changed. That is, the positions of the backgrounds which are non moving object regions, such as the trees T1, T3, and T4 do not change from the positions of the trees T1, T3, and T4 within the corresponding images P1, P3, and P4 prior to the positioning step, as illustrated in the fifth step from the top of FIG. 5. That is, the amount of positioning with respect to the backgrounds is 0. On the other hand, the positions of the cars D1, D3, and D4, which are the moving object regions within the images, are substantially matched with the position of the car D2 within the reference image P2. That is, the amount of positioning with respect to the moving object regions is 100%.

The corresponding images P1, P3, and P4 are positioned in this manner, such that the amounts of positioning for the moving object regions is greater than those for the non moving object regions. Note that in the present embodiment, the amount of positioning with respect to the non moving object regions is 0, that is, positioning is not performed with respect to these regions. Therefore, processes such as triangular division and the like may be omitted. By omitting such processes, the processing time can be shortened.

After positioning of the moving object regions is completed (steps S8 and S9), the combining section 41 generates the combined image C, by overlapping the corresponding images P1, P3, and P4, which have been positioned by the positioning section 40, onto the reference image P2 (step S10). Thereby, an image that gives a natural impression of speed, in which the car D as the moving object is pictured still while the background such as the trees T as non moving objects are flowing in the panned direction, that is, the horizontal direction, ca be obtained, as illustrated in the final step of FIG. 5.

Meanwhile, in the case that the CPU 22 judges that the flows hooting mode is not set at step S1, and that a normal photography mode is set (step S1: NO), the digital camera 1 performs normal photography, in which imaging is performed with a single exposure operation, to obtain a single set of image data (step S13).

Thereafter, the compression/decompression processing section 32 generates an image file from image data of the combined image C or image data obtained by normal photography (step S11), the media control section 33 records the image file into the recording medium 34 (step S12), and the process ends.

As described above, the digital camera 1 of the present embodiment obtains the plurality of images P1 through P4 by flow shooting. Then, the reference image P2 is selected from among the obtained plurality of images P1 through P4. Thereafter, moving object regions are specified within the corresponding images P1, P3, and P4, which are the plurality of images P1 through P4 other than the reference image P2. Next, the plurality of corresponding images P1, P3, and P4 are positioned with respect to the reference image P2 such that the amount of positioning is greater at the moving object regions than at non moving object regions. Finally, the plurality of corresponding images P1, P3, and P4, which have been positioned, are combined with the reference image P2. The moving object region and the regions other than the moving object region are separated and positioned. Therefore, it is not necessary to generate interpolative images, and processing time for generating the interpolative images and memory for storing the interpolative images are obviated. Accordingly, effective flow shot images can be obtained without increasing processing time or required memory capacity.

Note that in the present embodiment, the amount of positioning with respect to the non moving object regions is set to 0. However, the present invention is not limited to such a configuration, and data regarding the movement vectors of the non moving object regions illustrated in the second step of FIG. 5 may be corrected in the horizontal direction (the panning direction of the digital camera 1). By correcting the data regarding the movement of the non moving object regions in the horizontal direction, and performing the positioning process such that the amount of positioning with respect to the nonmoving object regions is less than the amount of positioning for the moving object regions, the appearance of flow of the background within the combined image C can be changed. That is, the degree of the impression of speed of the car D within the combined image C can be varied.

In addition, in the present embodiment, the moving object region specifying section 39 specified the moving object regions by employing the corresponding point detection results. Alternatively, for example, a region A which is set in advance may be specified as the moving object region, as illustrated in FIG. 8. In this case, the region A is displayed within the through the lens image while a user performs flow shooting, and the user may perform flow shooting while panning the digital camera 1 such that the moving object D is pictured within the displayed region A.

Figure 9:
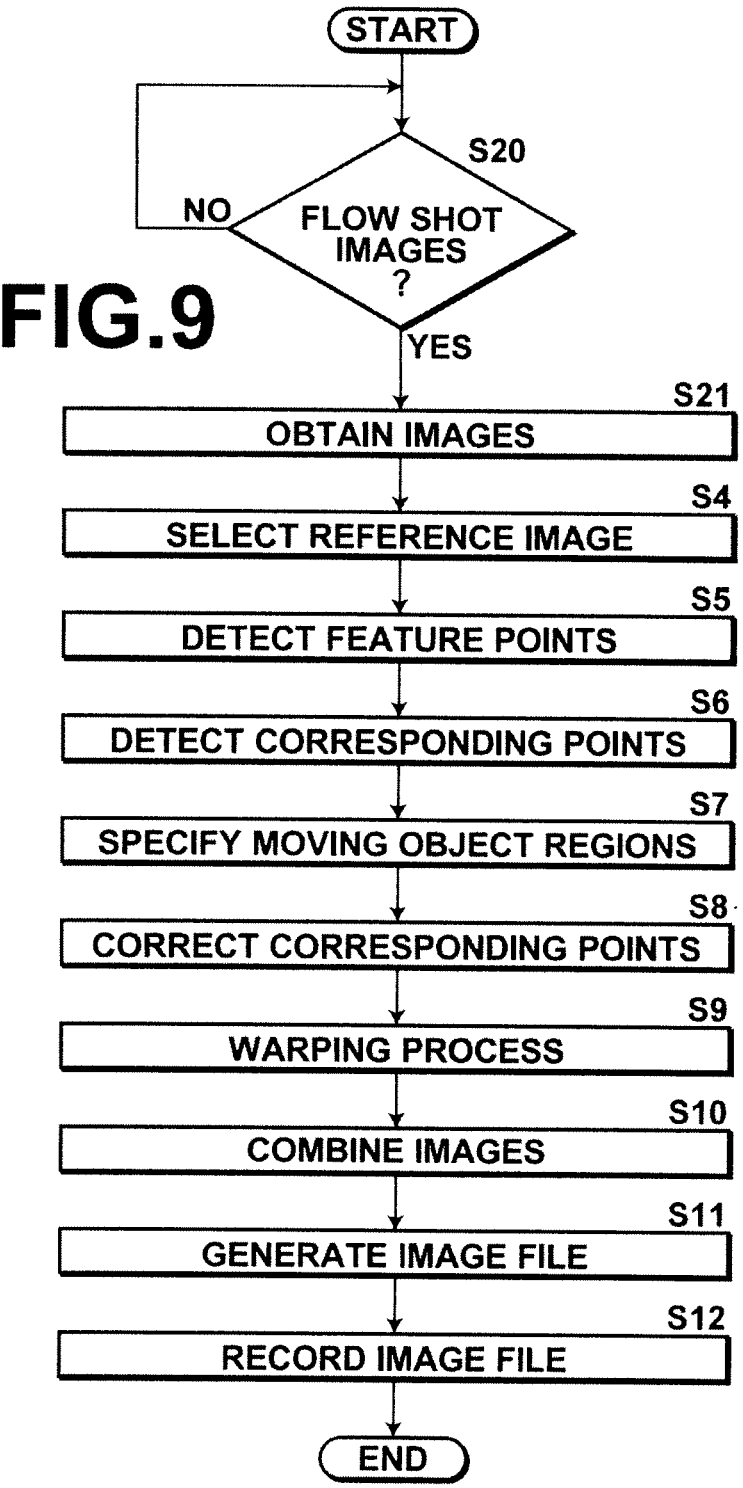
FIG. 9 us a flow chart that illustrates the steps of an image process, to which an image processing method according to another embodiment of the present invention is applied.
Figure 11A:
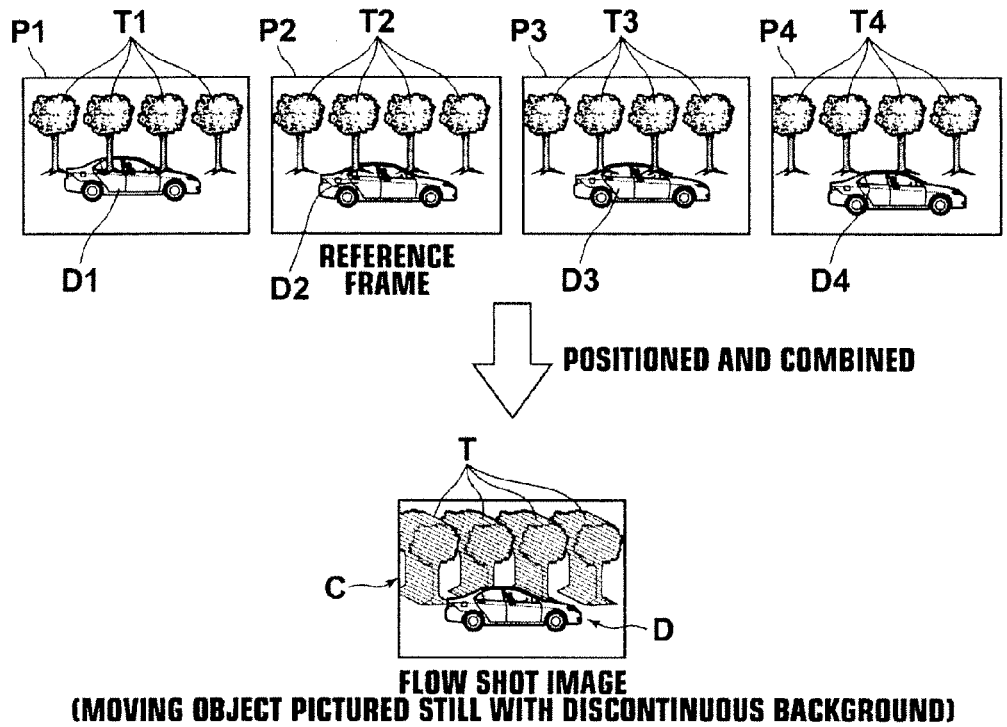
FIG. 11A is a diagram for explaining a conventional method for obtaining flow shot images.
Figure 11B:
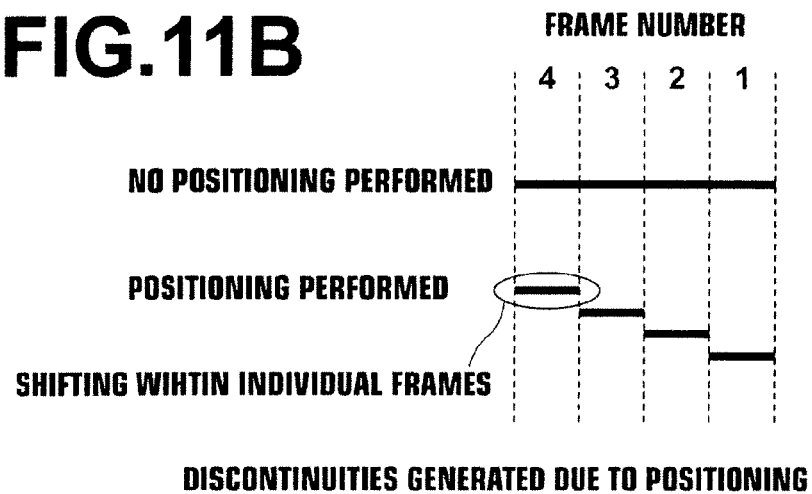
FIG. 11B is a diagram for explaining the problems of conventional flow shot images.

Next, an image processing method according to another embodiment of the present invention will be described. FIG. 9 is a flow chart that illustrates the steps of an image process, to which an image processing method according to an embodiment of the present invention is applied. Note that steps of the image process illustrated in FIG. 9 which are the same as those illustrated in FIG. 4 are denoted with the same step numbers, and detailed descriptions will only be given regarding steps which are different.

The image processing method of the present embodiment is an image processing method that causes a computer to function as the reference image selecting section 36, the feature point detecting section 37, the corresponding point detecting section 38, the moving object region specifying section 39, the positioning section 40, and the combining section 41. As illustrated in FIG. 9, first, it is judged whether image data of a plurality of image files which are input to the computer are those which have been obtained by flow shooting (step S20).

In the case that the plurality of sets of image data represent images which have been obtained by flow shooting (step S20: YES), the plurality of sets of input image data are obtained (step S21). In the case that the plurality of sets of image data do not represent images which have been obtained by flow shooting (step S20: NO), the process of step S20 is repeated until a plurality of sets of image data that represent images which have been obtained by flow shooting are input. Here, whether the image data represent images which have been obtained by flow shooting or by normal photography may be judged based on tag information which is attached to the image files.

The plurality of images which have been sequentially obtained by flow shooting by a digital camera or the like are obtained as described above. Then, the same image processes as those administered by the digital camera 1 of the previous embodiment are administered, and the same advantageous effects as those obtained by the digital camera 1 can be obtained.

The digital camera 1 and the image processing method according to embodiments of the present invention have been described. In addition, a program that causes a computer to function as the reference image selecting section 36, the feature point detecting section 37, the corresponding point detecting section 38, the moving object region specifying section 39, the positioning section 40, and the combining section 41 to carry out the processes illustrated in FIG. 9 is also an embodiment of the present invention. Further, a computer readable medium having such a program stored therein is also an embodiment of the present invention.

The imaging apparatus, the image processing method, and the image processing program of the present invention are not limited to the embodiments above. Various changes and modifications may be applied, as long as they do not stray from the spirit and scope of the present invention.

What is claimed is:

1. An imaging apparatus, comprising:
   imaging means, for obtaining images by imaging a subject;
   imaging control means, for controlling the imaging means to sequentially obtain a plurality of images;
   reference image selecting means, for selecting a single reference image from the plurality of images;
   moving object region specifying means, for specifying moving object regions within corresponding images, which comprise the plurality of images other than the single reference image selected by the reference image selecting means;
   positioning means, for positioning the corresponding images with respect to the reference image in a case that the plurality of images have been imaged by flow shooting, the positioning being performed such that an amount of positioning is greater at the moving object regions specified by the moving object region specifying means than at non-moving object regions;
   combining means, for combining the corresponding images, which have been positioned by the positioning means, with the reference image;
   feature point detecting means, for detecting feature points within the single reference image; and
   corresponding point detecting means, for detecting corresponding points within the corresponding images that correspond to the feature points detected by the feature point detecting means,
   wherein the moving object region specifying means specifies the moving object regions based on the feature points detected by the feature point detecting means and the corresponding points detected by the corresponding point detecting means,
   wherein a region having movement vectors less than a predetermined threshold value is designated as a moving object region of the moving object regions, and
   wherein the moving object region and the non-moving object regions are moved separately without generating interpolative images.

2. An imaging apparatus as defined in claim 1, wherein the moving object regions comprise predetermined regions within the images.

3. An imaging apparatus as defined in claim 2, wherein the amount of positioning performed by the positioning means with respect to regions of the images other than the moving object regions is 0.

4. An imaging apparatus as defined in claim 1, wherein the amount of positioning performed by the positioning means with respect to regions of the images other than the moving object regions is 0.

5. An imaging apparatus as defined in claim 1, wherein the moving object region specifying means further specifies the moving object regions based on whether the movement vectors include components that are less than the predetermined threshold value.

6. An imaging apparatus as defined in claim 1, wherein the movement vectors link the feature points with the corresponding points.

7. An imaging apparatus as defined in claim 1, wherein, in the moving object region, the movement vectors include components that are less than the predetermined threshold value.

8. An imaging apparatus as defined in claim 1, wherein the positioning means moves the moving object regions and the non-moving objects in each of the corresponding images such that the moving object regions and the non-moving objects respectively match positions of the moving object regions and the non-moving objects in the single reference image.

9. An imaging apparatus as defined in claim 1, wherein the positioning means performs the positioning such that an amount of a movement of the moving object regions, specified by the moving object region specifying means, in each of the corresponding images is greater than an amount of a movement of the non-moving object regions.

10. An image processing method to be executed by a computer, the method comprising:
    obtaining a plurality of images by flow shooting;
    selecting a reference image from the plurality of obtained images;
    specifying moving object regions within corresponding images, which comprise the plurality of images other than the selected reference image;
    positioning the corresponding images with respect to the reference image, the positioning being performed such that an amount of positioning is greater at the specified moving object regions than at non-moving object regions;
    combining the corresponding images, which have been positioned by the positioning means, with the reference image;
    detecting feature points within the reference image; and
    detecting corresponding points within the corresponding images that correspond to the detected feature points,
    wherein the moving object regions are specified based on the detected feature points and the detected corresponding points,
    wherein a region having movement vectors less than a predetermined threshold value is designated as a moving object region of the moving object regions, and
    wherein the moving object region and the non-moving object regions are moved separately without generating interpolative images.

11. An image processing method as defined in claim 10, wherein the positioning is performed such that the amount of positioning with respect to regions of the images other than the moving object regions is 0.

12. A non-transitory computer-readable storage medium, in which an image processing program is recorded, the image processing program causing a computer to execute:
    obtaining a plurality of images by flow shooting;
    selecting a reference image from the plurality of obtained images;
    specifying moving object regions within corresponding images, which comprise the plurality of images other than the selected reference image;
    positioning the corresponding images with respect to the reference image, the positioning being performed such that an amount of positioning is greater at the specified moving object regions than at non-moving object regions;
    combining the corresponding images, which have been positioned by the positioning means, with the reference image;
    detecting feature points within the reference image; and
    detecting corresponding points within the corresponding images that correspond to the detected feature points,
    wherein the moving object regions are specified based on the detected feature points and the detected corresponding points,
    wherein a region having movement vectors less than a predetermined threshold value is designated as a moving object region of the moving object regions, and
    wherein the moving object region and the non-moving object regions are moved separately without generating interpolative images.

13. A non-transitory computer-readable storage medium as defined in claim 12, wherein the program recorded therein causes the computer to execute the positioning such that the amount of positioning with respect to regions of the images other than the moving object regions is 0.

* * * * *